US010858104B2

(12) United States Patent
Maghsoodi et al.

(10) Patent No.: US 10,858,104 B2
(45) Date of Patent: Dec. 8, 2020

(54) RESCUE HOIST CABLE ANGLE DETECTION ASSEMBLY

(71) Applicant: GOODRICH CORPORATION, Charlotte, NC (US)

(72) Inventors: Bejan Maghsoodi, Diamond Bar, CA (US); Patrick Sherry, Long Beach, CA (US)

(73) Assignee: Goodrich Corporation, Charlotte, NC (US)

( * ) Notice: Subject to any disclaimer, the term of this patent is extended or adjusted under 35 U.S.C. 154(b) by 278 days.

(21) Appl. No.: 16/035,393

(22) Filed: Jul. 13, 2018

(65) Prior Publication Data

US 2020/0017217 A1    Jan. 16, 2020

(51) Int. Cl.
| | |
|---|---|
| *B64D 1/22* | (2006.01) |
| *B66D 1/54* | (2006.01) |
| *B66D 1/36* | (2006.01) |
| *G01B 5/24* | (2006.01) |

(52) U.S. Cl.
CPC ............. *B64D 1/22* (2013.01); *B66D 1/36* (2013.01); *B66D 1/54* (2013.01); *G01B 5/24* (2013.01)

(58) Field of Classification Search
None
See application file for complete search history.

(56) References Cited

U.S. PATENT DOCUMENTS

2017/0240293 A1    8/2017  Repp et al.

FOREIGN PATENT DOCUMENTS

EP            583816         9/1997

*Primary Examiner* — Harshad R Patel
*Assistant Examiner* — Nigel H Plumb
(74) *Attorney, Agent, or Firm* — Snell & Wilmer L.L.P.

(57) ABSTRACT

A cable angle detection assembly is provided. The cable angle detection assembly may include a housing defining an axis configured to allow a cable to pass partially through the housing such that a first portion of the cable is aligned with the axis. The cable angle detection assembly may include a bracket rotatably disposed within the housing. The cable angle detection assembly may include a guide element mounted to the bracket configured to guide the cable, when in tension, to be wrapped partially therearound thereby allowing a fleet angle to be defined between the first portion of the cable and a second portion of the cable that extends tangentially away from the guide element.

19 Claims, 10 Drawing Sheets

RESCUE HOIST CABLE ANGLE DETECTION ASSEMBLY

FIELD

The present disclosure relates generally to cable hoists, and more particularly to a rescue hoist assembly having a cable angle detection assembly.

BACKGROUND

Hoist and winches are commonly used on aircrafts and ships to haul, pull, raise, and lower heavy loads. The fleet-angle is the angle between the center axis of alignment (i.e., in a hoist, where the cable hangs if no force other than gravity were acting upon it) and the cable. An aircraft operator may need to accurately determine if the fleet-angle of the cable exceeds a certain value. Maintaining a safe fleet-angle may prevent excessive load on the hoist and/or aircraft. Upon determining the fleet angle, an aircraft operator may make adjustments to the velocity or position of the aircraft.

SUMMARY

A cable angle detection assembly is provided. The cable angle detection assembly may include a housing defining an axis configured to allow a cable to pass partially through the housing such that a first portion of the cable is aligned with the axis. The cable angle detection assembly may include a bracket rotatably disposed within the housing. The cable angle detection assembly may include a guide element mounted to the bracket configured to guide the cable, when in tension, to be wrapped partially therearound thereby allowing a fleet angle to be defined between the first portion of the cable and a second portion of the cable that extends tangentially away from the guide element. The cable angle detection assembly may include a strain sensor in operable communication with the guide element and the bracket, the strain sensor configured to sense a load related to the fleet angle.

According to various embodiments, the cable angle detection assembly may include a first bearing disposed between the bracket and the housing at the first end of the housing and a second bearing disposed between the bracket and the housing at the second end of the housing. According to various embodiments, the strain sensor is a double shear load pin. According to various embodiments, the cable angle detection assembly may include a slip ring assembly coupled with the housing. According to various embodiments, the cable angle detection assembly may include a cap coupled with the bracket.

According to various embodiments, the cable angle detection assembly may include a second guide element configured to guide the cable, when in tension, to be wrapped partially therearound thereby allowing the fleet angle to be defined between the first portion of the cable and the second portion of the cable that extends tangentially away from the second guide element. According to various embodiments, the second guide element may be mounted to the bracket via a second strain sensor. According to various embodiments, the cable angle detection assembly may include a third guide element configured to guide the cable, when in tension, to be wrapped partially therearound thereby allowing the fleet angle to be defined between the first portion of the cable and the second portion of the cable that extends tangentially away from the third guide element. According to various embodiments, the third guide element may be mounted to the bracket via a third strain sensor.

According to various embodiments, a hoist system is provided. The hoist system may include an airframe mechanically coupled to a hoist assembly. The hoist system may include a cable disposed between the hoist assembly and a hook assembly. The hoist system may include a cable angle detection assembly disposed between the hoist assembly and the hook assembly. The cable angle detection assembly may include a housing defining an inner cavity, wherein the housing comprises a first end and a second end downstream of the first end. The cable angle detection assembly may include a bracket disposed within the housing. The cable angle detection assembly may include a guide element mounted to the bracket via a strain sensor. The cable angle detection assembly may include a cap coupled with the bracket, the cap comprising an aperture at least partially defined by an inner wall of the cap and passing from an upstream side to a downstream side of the cap.

According to various embodiments, the cable angle detection assembly may include a first bearing disposed between the bracket and the housing at the first end of the housing and a second bearing disposed between the bracket and the housing at the second end of the housing. According to various embodiments, the strain sensor is a double shear load pin. According to various embodiments, the cable angle detection assembly may include a slip ring assembly coupled with the housing. According to various embodiments, the cable angle detection assembly may include a second guide element mounted to the bracket via a second strain sensor. According to various embodiments, the cable angle detection assembly may include a cable disposed within the inner cavity of the housing, wherein the cable abuts the second guide element and creates a second load in the second strain sensor. According to various embodiments, the cable angle detection assembly may include a third guide element mounted to the bracket via a third strain sensor. According to various embodiments, the cable may abut the guide element and creates a first load in the strain sensor. According to various embodiments, the cable may abut the third guide element and creates a third load in the third strain sensor.

In various embodiments, a method of method of detecting a fleet angle of a hoist assembly is provided. The method may include sensing strain between a guide element and a bracket, the guide element being configured to allow a cable in tension to wrap partially there-around between a first portion of the cable aligned with the bracket and a second portion of the cable that extends tangentially from the guide element in a direction of a load creating the tension in the cable. The method may include determining the fleet angle based upon the sensed strain and a level of tension in the cable. The method may include coupling a first bearing to the bracket. The method may include displaying the fleet angle on a display. In various embodiments, the level of tension in the cable is detected by at least one of a motor controller, a load pin or a load meter.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials. In some cases, reference coordinates may be specific to each figure.

Hoist load sensors and systems of the present disclosure may accurately measure the load imparted into the airframe of an aircraft through a hoist. A strain sensor measures strain or tension in guide element in a hoist. The signal from the strain sensor may then be processed and converted to determine the fleet angle of the rescue hoist cable.

Figure 1:
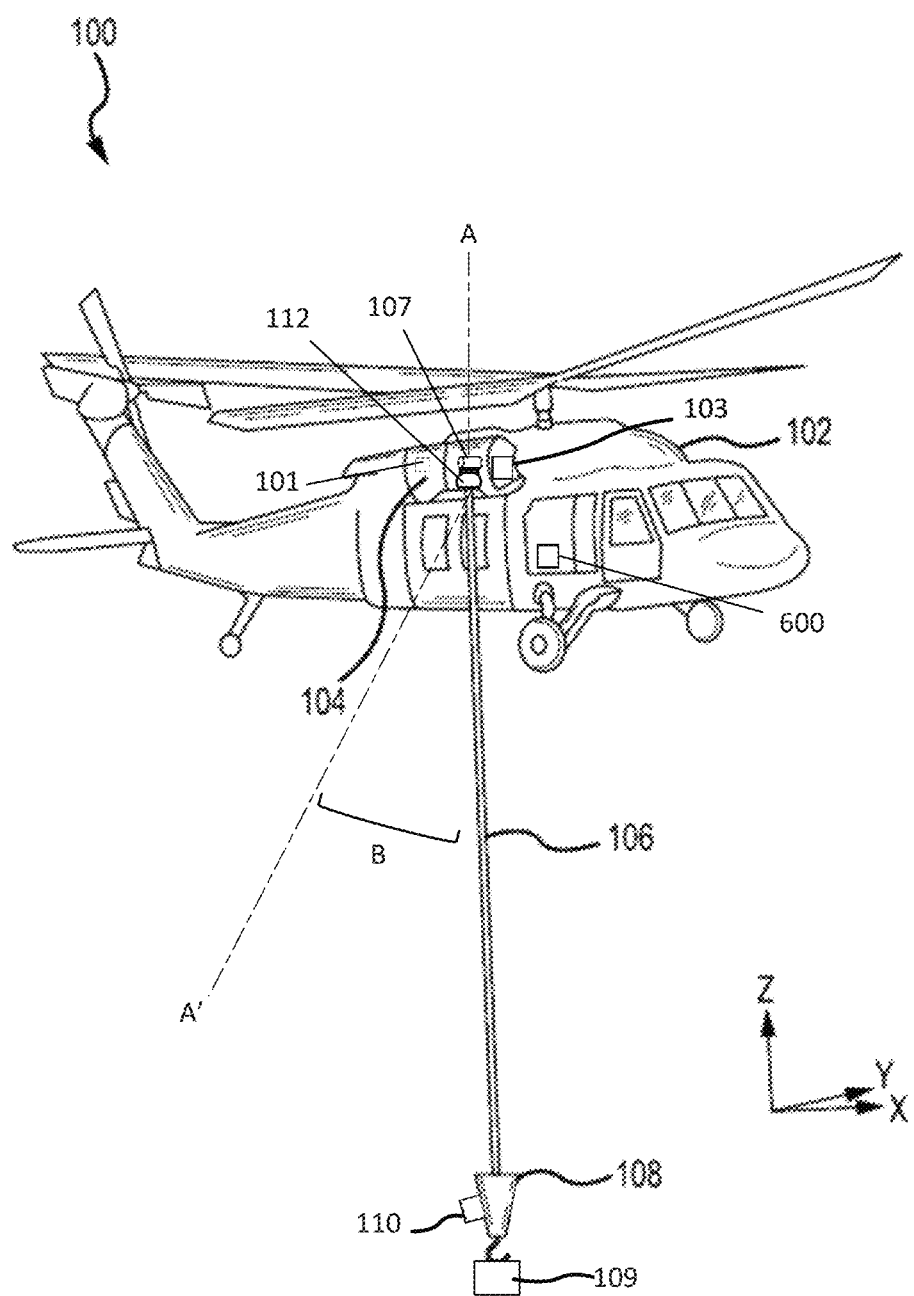
FIG. 1 illustrates a hoist assembly, hook assembly, and cable angle detection assembly mechanically coupled, in accordance with various embodiments.

Referring now to FIG. 1, a hoist system 100 is shown, in accordance with various embodiments. Hoist system 100 may be powered by motor controller 101, which may detect an amount of current to power hoist system 100. Hoist assembly 104 may be coupled directly to airframe 102 or mechanically coupled to a boom that is mechanically coupled to airframe 102. In various embodiments, hoist assembly 104 may comprise drum 109 and cable angle detection assembly (hereafter "CADA") 112. Hoist assembly 104 may comprise a load pin 103 configured to detect cable tension. Cable 106 may be wound about drum 109 within hoist assembly 104 and released or retracted based on rotation of the drum. Cable 106 may thus hang at various distances from hoist assembly 104 and airframe 102. A hook assembly 108 may be coupled to cable 106 at the free end of the cable opposite hoist assembly 104. Hook assembly 108 may hang from hoist assembly 104 on cable 106. Hook assembly 108 may comprise a load meter 110 to detect tension on cable 106. Hook assembly 108 may hang from hoist assembly 104 on cable 106 and carry load 109. In various embodiments, load 109 may be coupled directly to cable 106.

Cable 106 may extend from drum 107 along axis A. Axis A may comprise where cable 106 hangs if no force other than gravity were acting upon it. Cable 106 may swing and/or translate relative to axis A. The angle between the cable 106 and axis A is referred to as fleet angle B. Fleet angle B may be caused in part by tension on cable 106 caused by load 109. Load 109 may cause cable 106 to translate relative to axis A causing fleet angle B. Fleet angle B may be increased or decreased by changing the position of load 109 and/or the position, speed, or velocity of airframe 102. According to various embodiments herein, CADA 112 may be coupled to airframe 102 or a boom assembly between drum 107 and hook assembly 108.

Figure 2:
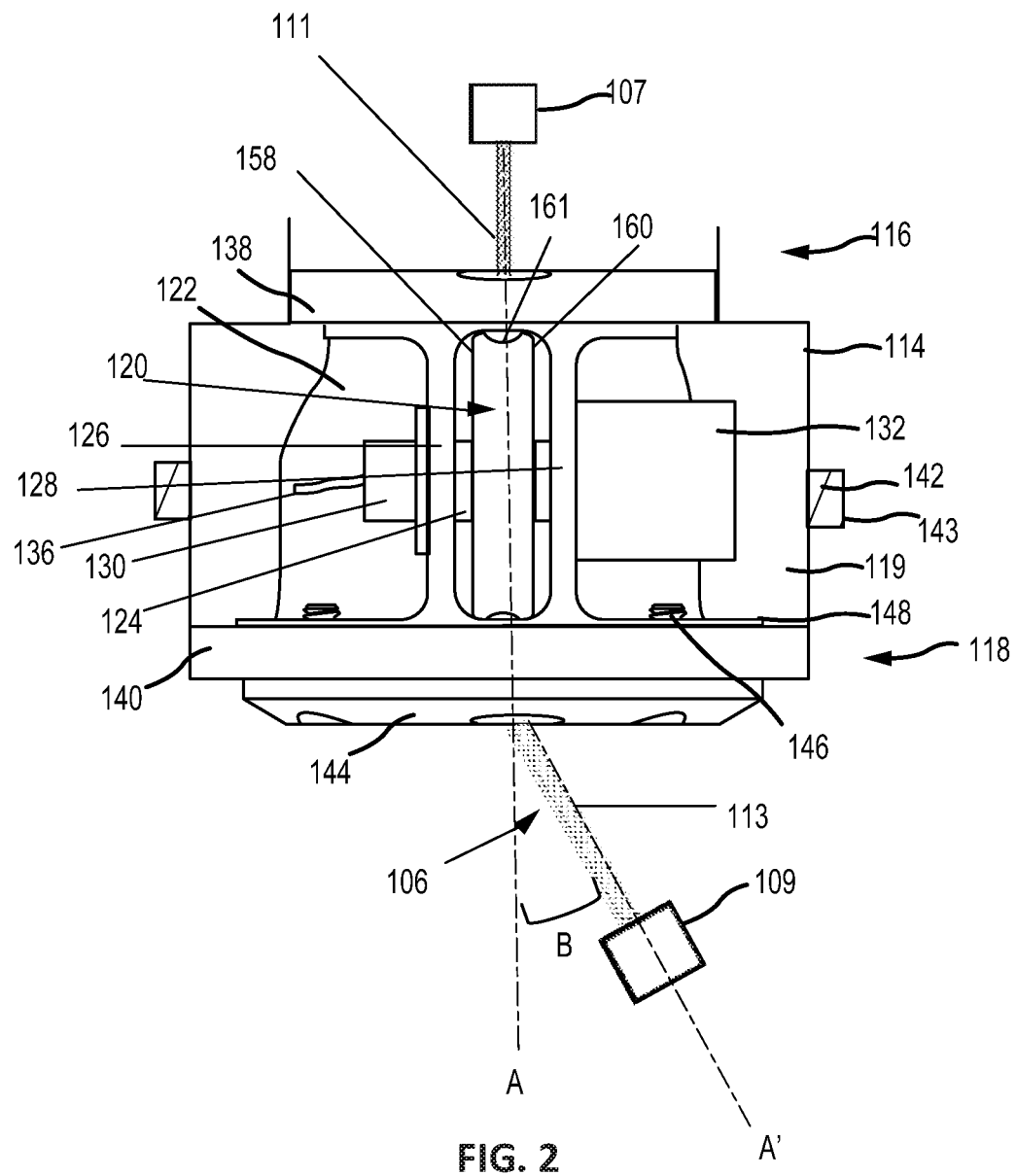
FIG. 2 illustrates a cable angle detection assembly in accordance with various embodiments.

In various embodiments and with reference to FIG. 2, CADA 112 may comprise a housing 114. Housing 114 may comprise a first end 116 upstream of a second end 118. Housing 114 may define inner cavity 119. Housing 114 may define axis configured to allow cable 106 to pass partially through the housing 114 such that a first portion 111 of the cable 107 is aligned with the axis A. In various embodiments CADA 112 may comprise guide element 120 disposed within and mounted to bracket 122 via a strain sensor 124. Bracket 122 may be rotatably disposed within housing 114. In various embodiments, guide element 120 may be disposed between and mounted to first segment 126 and second segment 128 of bracket 122 via strain sensor 124. Guide element 120 may comprise first edge 158, second edge 160, and center portion 161. Guide element 120 may be load bearing and comprise an idler, and may turn freely about a strain sensor 124. Guide element 120 may comprise a sheave. In various embodiments, guide element 120 may be mounted to bracket 122 and configured to guide cable 106, when in tension, to be wrapped partially therearound, thereby allowing a fleet angle B to be defined between the first portion 111 of the cable 106 and a second portion 113 of the cable 106 that extends tangentially away from the guide element 120.

In various embodiments, strain sensor 124 may be configured to accurately measure the load imparted on guide element 120. Stated another way, strain sensor 124 may be in operable communication with the guide element 120 and bracket 122, and the strain sensor 124 may be configured to sense a load related to fleet angle B. In various embodiments, strain sensor 124 may be a load pin or a double shear load pin. In various embodiments, and with reference to FIG. 2 and FIG. 3, strain sensor 124 may comprise a first end 130, a second end 132, and a center segment 134 disposed between the first end 130 and second end 132. Center segment 134 may be disposed within guide element 120 and comprise hardware capable of sensing strain that is applied to guide element 120 by cable 106. First end 130 may comprise wiring 136 that may transmit the strain magnitude to output reader 500 (see FIG. 7A and FIG. 7B). In various embodiments, strain sensor 124 may be mounted to first segment 126 of bracket 122 via first end 130. In various embodiments, strain sensor 124 may be mounted to second segment 128 of bracket 122 via second end 132.

In various embodiments and with reference to FIGS. 1-2, CADA 112 may comprise first bearing 138 disposed between bracket 122 and housing 114 at first end 116. In various embodiments, CADA 112 may comprise second bearing 140 disposed between bracket 122 and housing 114 at second end 118. First bearing 138 and second bearing 140 may be disposed radially outward of bracket 122 and may be coupled with housing 114 such that bracket 122, guide element 120, strain sensor 124, and cap 144 may rotate radially about axis A within housing 114.

In various embodiments, CADA 112 may comprise a slip ring assembly 142. Slip ring assembly 142 may comprise any type of rotary to stationary power transfer device (e.g., woven wire brushes, liquid metal contacts, ion in solution contacts, and inductive devices). Slip ring assembly 142 may comprise shield 143 disposed radially outward of slip ring assembly 142 for protection and insulation. In various embodiments, slip ring assembly 142 may comprise a metal or metal alloy, for example, copper, beryllium-copper, brass, or the like. In various embodiments, slip ring assembly 142 may be further treated, for example, by coating with a precious metal such as gold to enhance the conductivity and/or electrical performance of the slip ring assembly 142.

Figure 3:
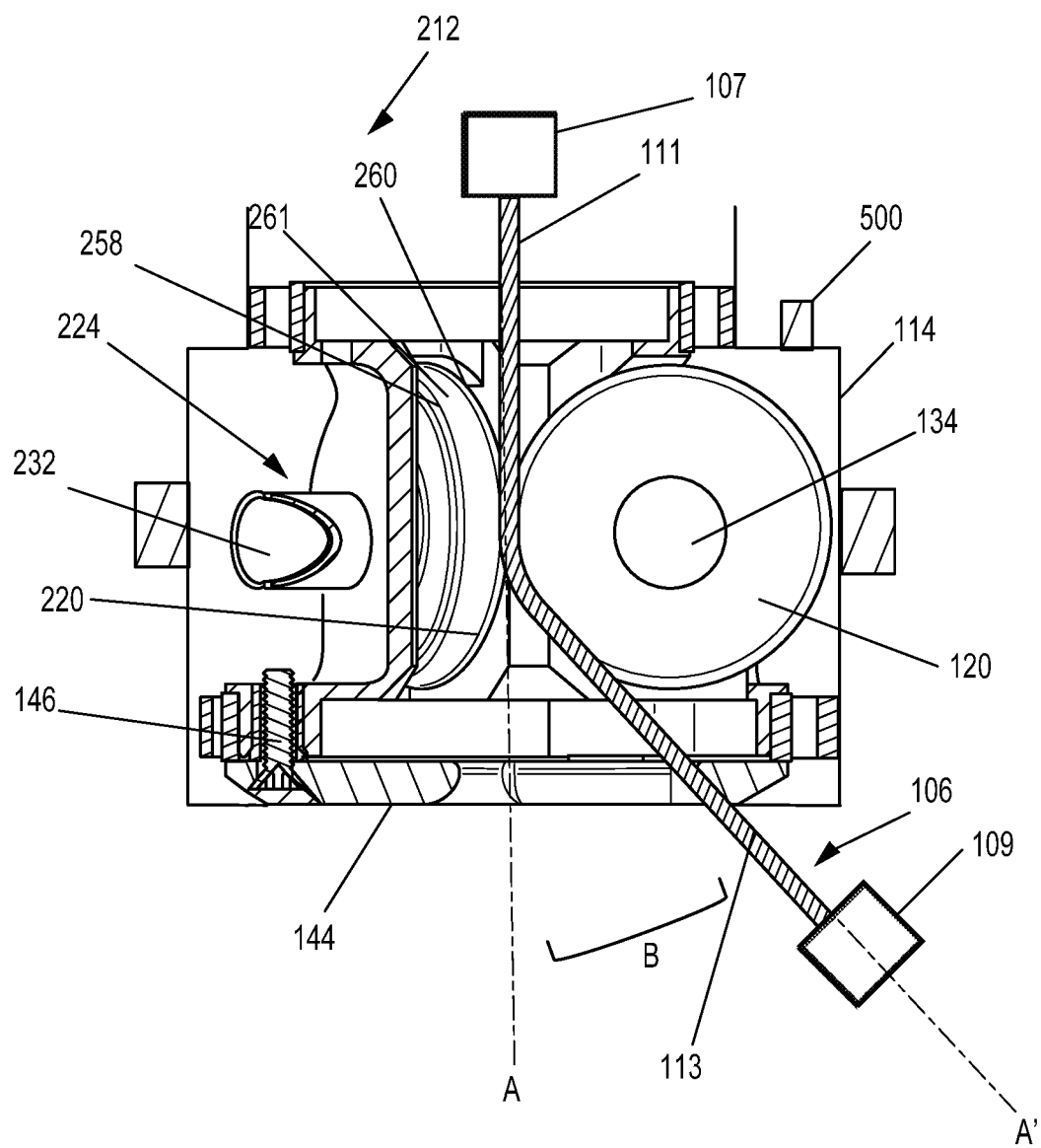
FIG. 3 illustrates a cable angle detection assembly in accordance with various embodiments.
Figure 4:
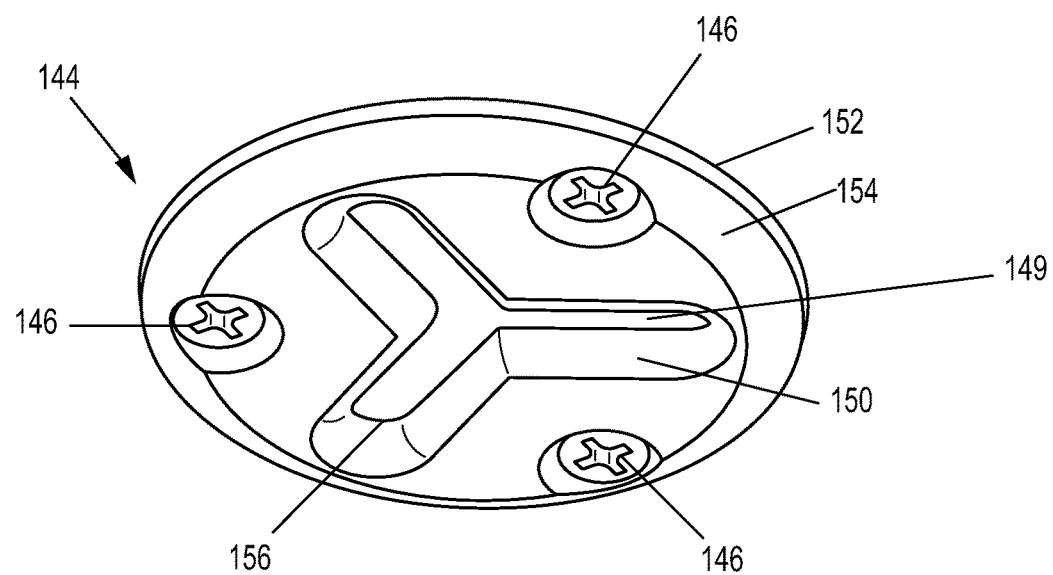
FIG. 4 illustrates a cap of a cable angle detection assembly in accordance with various embodiments.

In various embodiments and with reference to FIG. 2-FIG. 4, CADA 112 is shown with various elements omitted for clarity. CADA 112 may comprise cap 144 at second end 118 of CADA 112. Cap 144 may be coupled with bracket 128 via a fastener 146. Fastener 146 may be threaded and may be disposed through cap 144 and downstream end 148 of bracket 122. Cap 144 may comprise a plurality of fasteners 146. As shown in FIG. 4, cap 144 comprises three fasteners 146.

Figure 5:
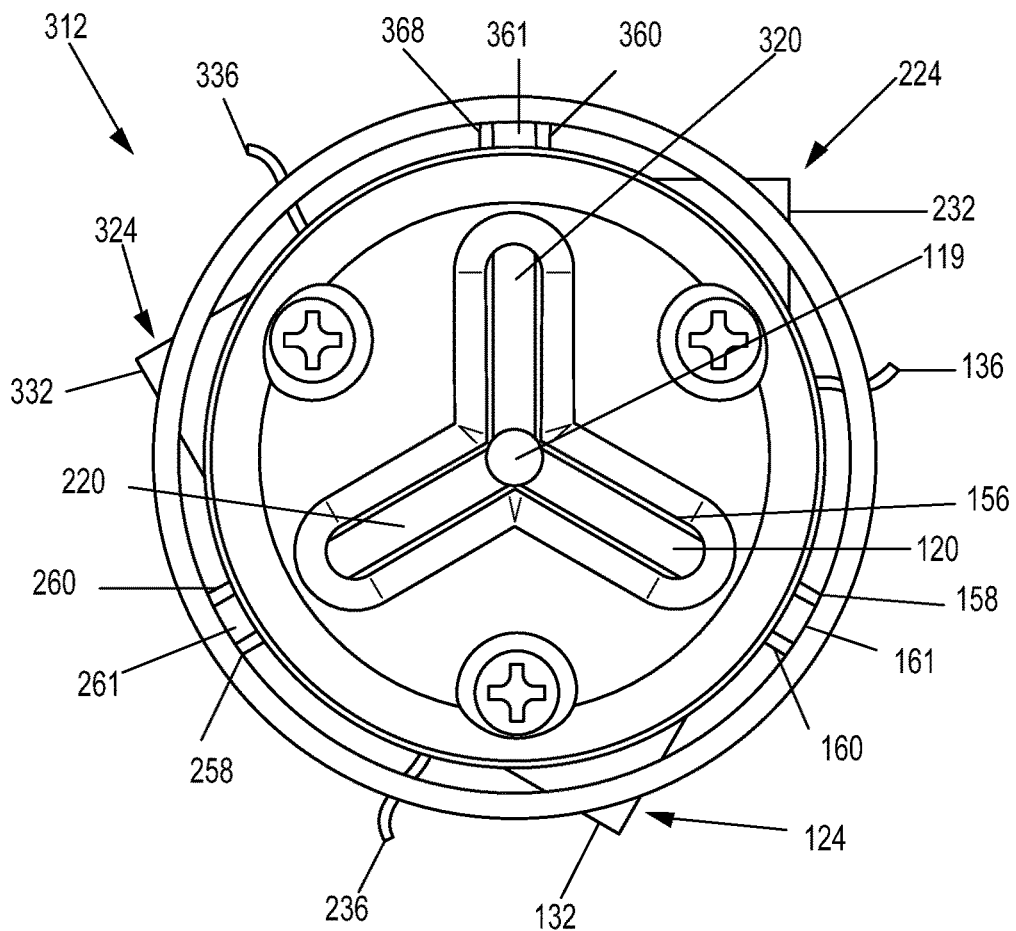
FIG. 5 illustrates a cable angle detection assembly in accordance with various embodiments.

In various embodiments and with reference to FIG. 4, cap 144 may comprise aperture 149 at least partially defined by an inner wall 150 of the cap 144 and passing from an upstream side 152 to a downstream side 154 of cap 144. Inner wall 150 may be disposed at an angle between upstream side 152 and downstream side 154 of cap 144. With reference to FIG. 5, CADA 312 is shown. Aperture 149 may be positioned directly downstream of guide element 120, second guide element 220, or third guide element 320. Upstream edge 156 of inner wall 150 may be positioned directly downstream of first edge 158 and second edge 160 of guide element 120. In various embodiments, aperture 149 may be a variety of shapes to accommodate the movement of cable 106 through inner cavity 119. For example, aperture 149 may have a shape of a 'Y,' 'X,' or 'I.' Cable 106 may translate within aperture 149.

In various embodiments and with reference back to FIG. 3, CADA 212 is shown with various elements omitted for clarity. CADA 212 may comprise a second guide element 220 disposed at least partially within and mounted to bracket 122 via a second strain sensor 224. Second guide element 220 may be identical to guide element 120 in all aspects, and second strain sensor 224 may be identical to strain sensor 124 in all aspects. Thus, second strain sensor 224 may comprise a double shear load pin and be configured to accurately measure the strain imparted on second guide element 220 by cable 106. In various embodiments, second guide element 220 may be mounted to bracket 122 and configured to guide cable 106, when in tension, to be wrapped partially therearound, thereby allowing a fleet angle B to be defined between the first portion 111 of the cable 106 and a second portion 113 of the cable 106 that extends tangentially away from second guide element 220. Second strain sensor 224 may be in operable communication with the second guide element 220 and bracket 122, and the second strain sensor 224 may be configured to sense a load related to fleet angle B. Second guide element 220 may comprise first edge 258, second edge 260, and center portion 261. Within housing 114, guide element 120 and second guide element 220 may be positioned such that cable 106 may be disposed between center portion 161 of guide element 120 and center portion 261 of second guide element 220.

Figure 6:
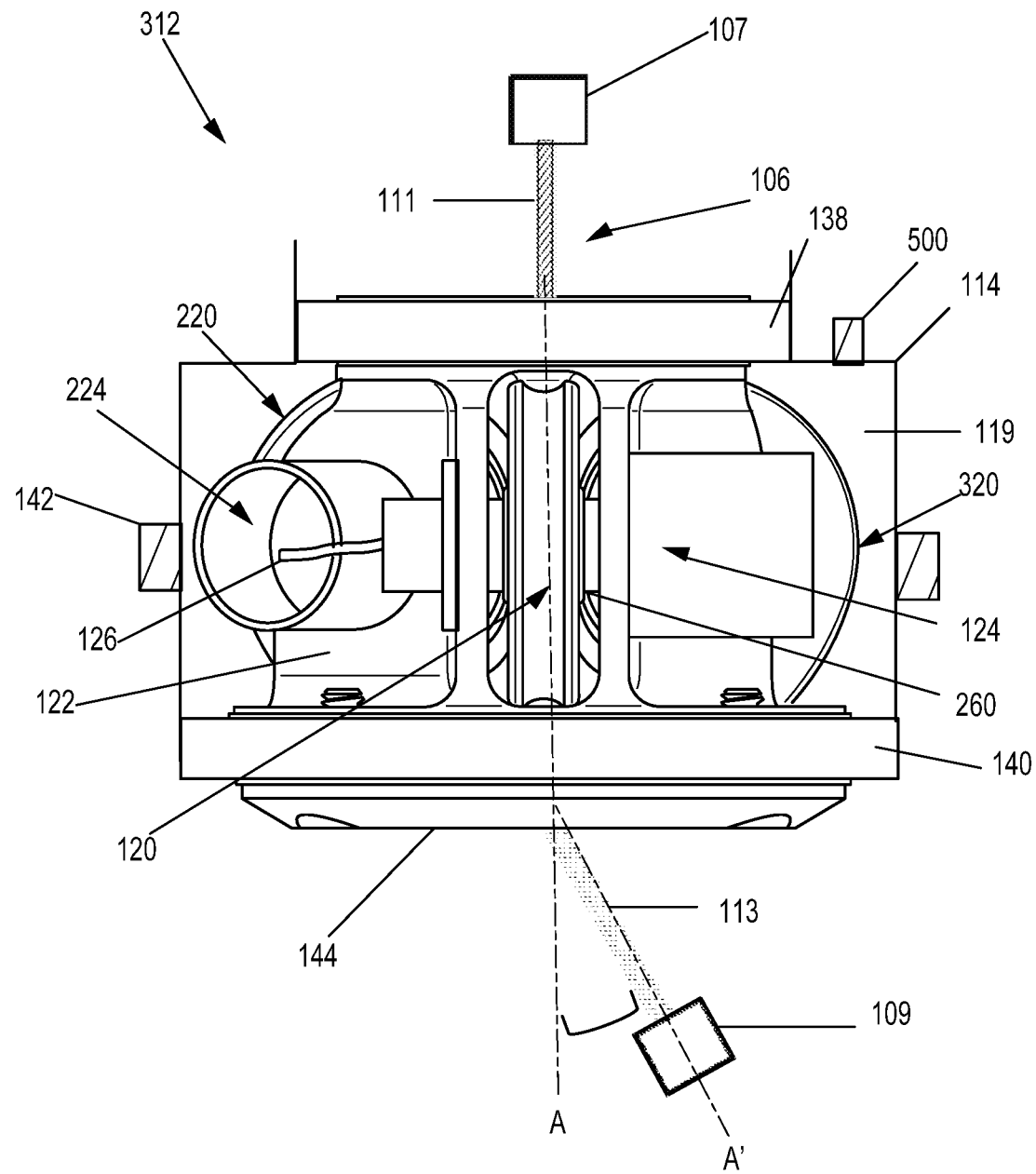
FIG. 6 illustrates a cable angle detection assembly in accordance with various embodiments.

In various embodiments and with reference to FIG. 5-6, CADA 312 is shown with various elements omitted for clarity. CADA 312 may comprise a third guide element 320 disposed at least partially within and mounted to bracket 122 via a third strain sensor 324. Third guide element 320 may be identical to guide element 120 in all aspects, and third strain sensor 324 may be identical to strain sensor 124 in all aspects. In various embodiments, third guide element 320 may be mounted to bracket 122 and configured to guide cable 106, when in tension, to be wrapped partially therearound, thereby allowing a fleet angle B to be defined between the first portion 111 of the cable 106 and a second portion 113 of the cable 106 that extends tangentially away from second guide element 320. Third strain sensor 324 may be in operable communication with the third guide element 320 and bracket 122, and the third strain sensor 324 may be configured to sense a load related to fleet angle B. Thus, third strain sensor 324 may comprise a double shear load pin and be configured to accurately measure the load imparted on third guide element 320 by cable 106. As shown in FIG. 5, guide element 120, second guide element 220, and third guide element 320 may be positioned such that cable 106 is disposed between center portion 161 of guide element 120, the center portion 261 of second guide element 220, and the center portion 361 of third guide element 320.

Figure 7A:
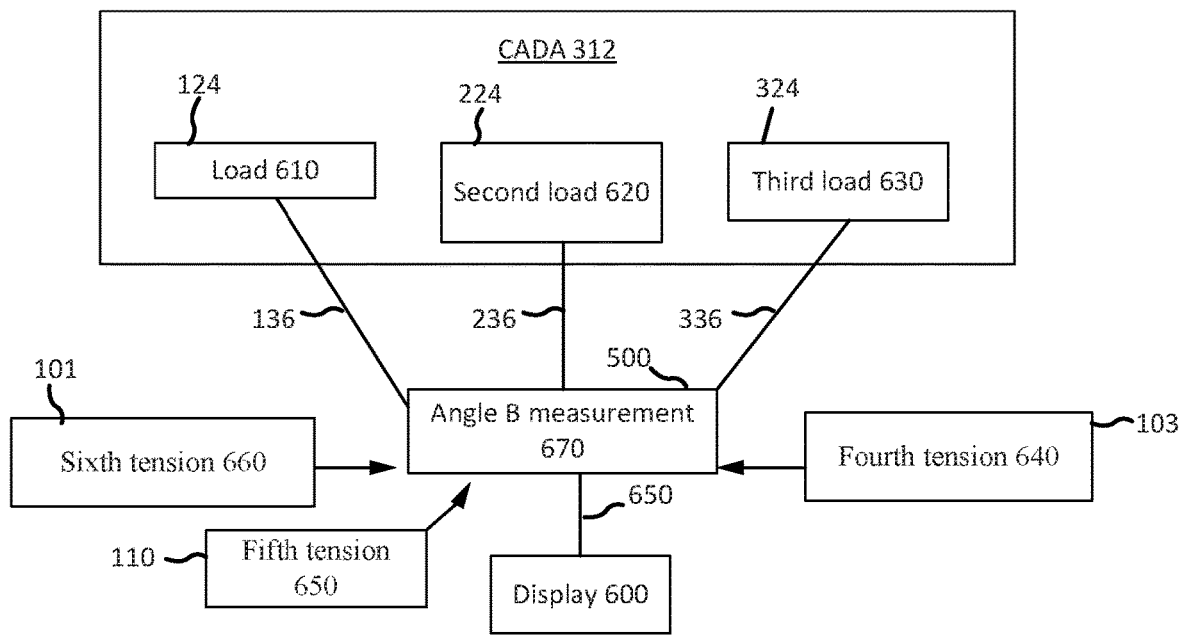
FIG. 7A illustrates a flow diagram for detecting and displaying an angle measurement in accordance with various embodiments.

In various embodiments and with reference to FIGS. 6 and 7A, cable 106 may extend from drum 107 to hook assembly 108 or load 109, and may be disposed within inner cavity 119 of CADA 312. As hook assembly 108 or load 109 reels downstream of drum 107, cable 106 may abut make contact with any one of guide element 120, second guide element 220 or third guide element 320. For example, as cable 106 makes contact with guide element 120, guide element 120 may translate, compress, or rotate radially. The movement of guide element 120 may result in a load 610 being exerted on strain sensor 124. Strain sensor 124 may communicate the magnitude of the load 610 with output reader 500 via wiring 136. As referenced above, cable 106 may swing and/or translate along axis A' and create fleet angle B relative to axis A. As fleet angle B increases, the load 610 exerted on strain sensor 124 may increase.

In various embodiments, output reader 500 may be coupled to housing 114. Output reader 500 may be implemented in a single processor or one or more processors configured to implement various logical operations in response to execution of instructions, for example, instructions stored on a non-transitory, tangible, computer-readable medium which may store data used, for example, for trending and analysis/prognosis purposes. Output reader 500 may comprise suitable system software and hardware components.

As cable 106 makes contact with second guide element 220, second guide element 220 may translate, compress, or rotate radially. The movement of second guide element 220 may result in a second load 620 being exerted on second strain sensor 224. Second strain sensor 224 may communicate the magnitude of the second load 620 with output reader 500 via wiring 236. As cable 106 may swing and/or translate along axis A' and fleet angle B increases, the second load 620 exerted on second strain sensor 224 may increase.

Similarly, as cable 106 makes contact with third guide element 320, third guide element 320 may translate, compress, or rotate radially. The movement of third guide element 320 may result in a third load 630 being exerted on third strain sensor 324. Third strain sensor 324 may communicate the magnitude of the third load 630 with output reader 500 via wiring 336. As fleet angle B increases, the third load 630 exerted on third strain sensor 324 may increase.

In various embodiments, and with reference to FIGS. 1 and 7A, output reader 500 may also receive input from at least one of motor controller 101, load meter 110, or load pin 103. For example, in various embodiments, a fourth tension 640 measured by load pin 103 may be communicated to output reader 500. In various embodiments, a fifth tension 650 measured by load meter 110 may be communicated to output reader 500. In various embodiments, a measure of current 660 being used by motor controller 101 may be communicated to output reader 500.

Figure 7B:
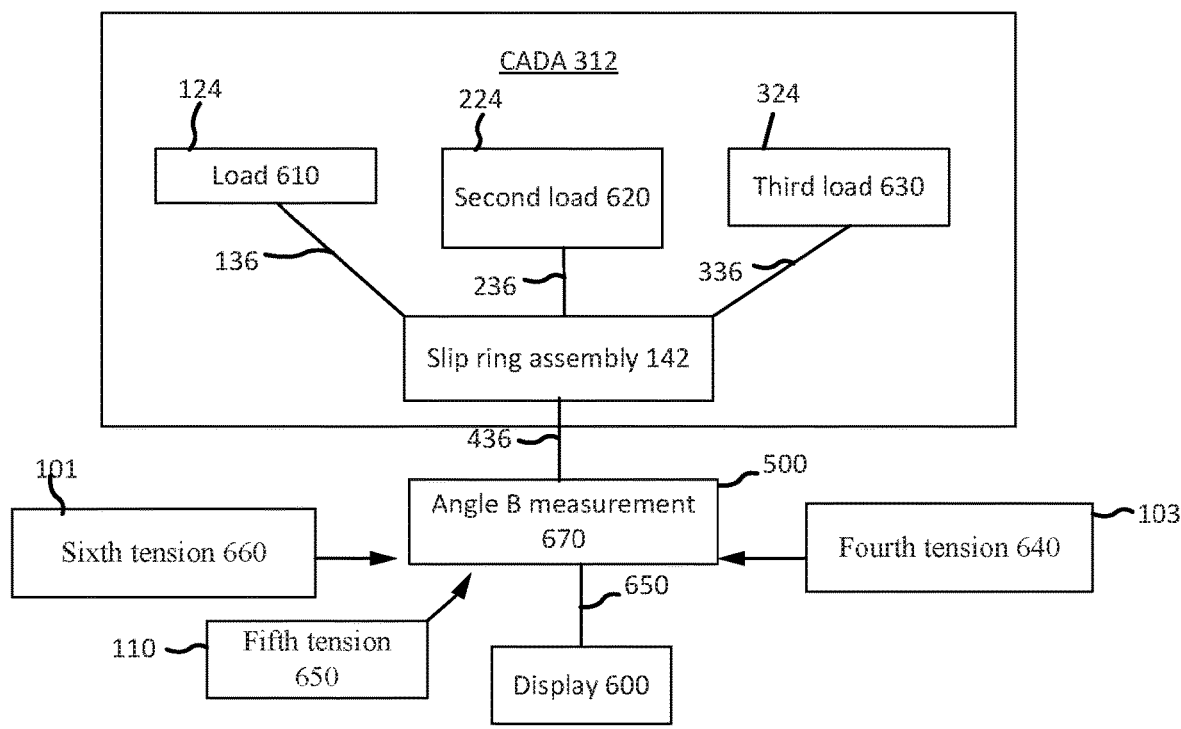
FIG. 7B illustrates a flow diagram for detecting and displaying an angle measurement in accordance with various embodiments.

With reference to FIG. 7B, slip ring assembly 142 may pass signals to and from at least one of wiring 136, wiring 236, and wiring 336, and output reader 500 via wiring 436, to electrically couple and power the components.

With reference to FIGS. 7A and 7B, using one or more of the load 610, second load 620, and third load 630 as well as one or more of fourth tension 640, fifth tension 650, or current 660, output reader 500 may determine measurement 670 of calculate fleet angle B via a calculation or use of a lookup table. Measurement 670 of fleet angle B may be communicated to display 600 by, for example radio frequency signals 650. In various embodiments, display 600 may comprise hardware and/or software configured to display measurement 670. Display 600 may comprise a handheld pendant or readout display located within airframe 102. Based on the measurement 670 of fleet angle B, adjustments to hoist system 100 may be made. For example, if measurement 670 of fleet angle B is too high, for example, above thirty degrees, adjustments may be made to hoist system 100 by operators of hoist assembly hoist system 100 or airframe 102 to decrease measurement 670 of fleet angle B. An adjustment to hoist system 100 or airframe 102 may comprise, for example, lengthening cable 106 or adjusting the position or lateral velocity of airframe 102.

Figure 8:
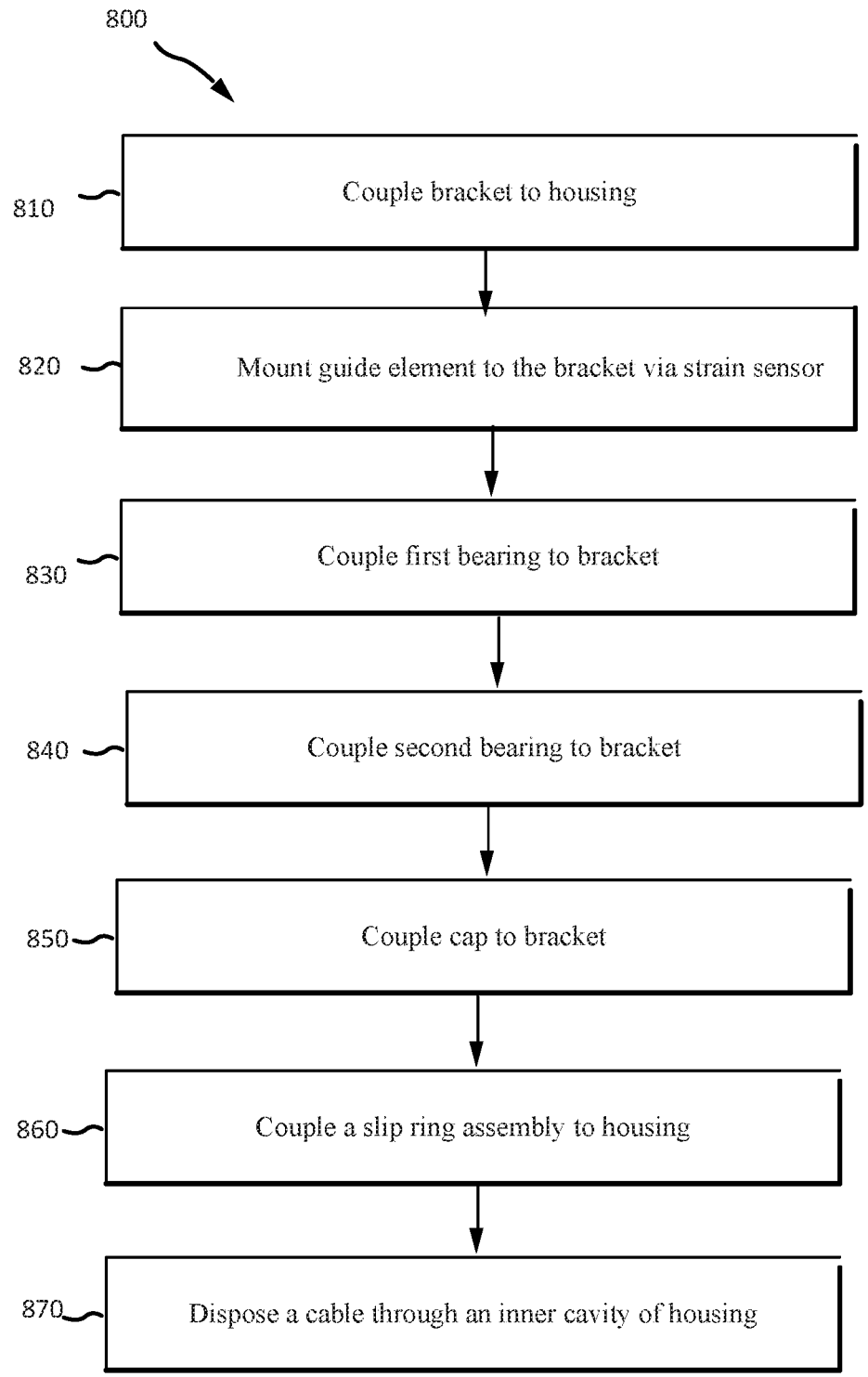
FIG. 8 illustrates a flow diagram of a process for manufacturing a cable angle detection assembly in accordance with various embodiments.
Figure 9:
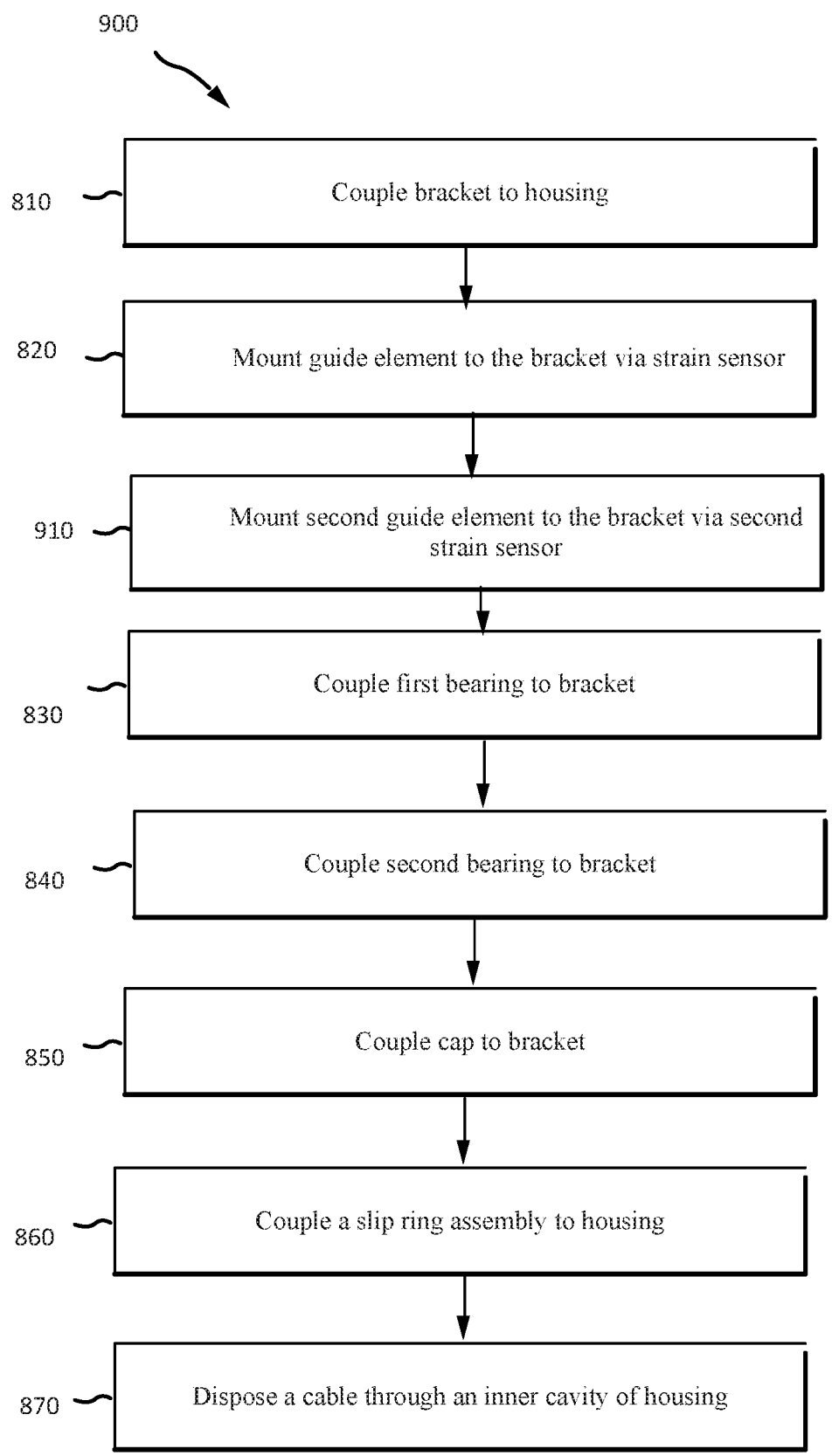
FIG. 9 illustrates a flow diagram of a process for manufacturing a cable angle detection assembly in accordance with various embodiments.
Figure 10:
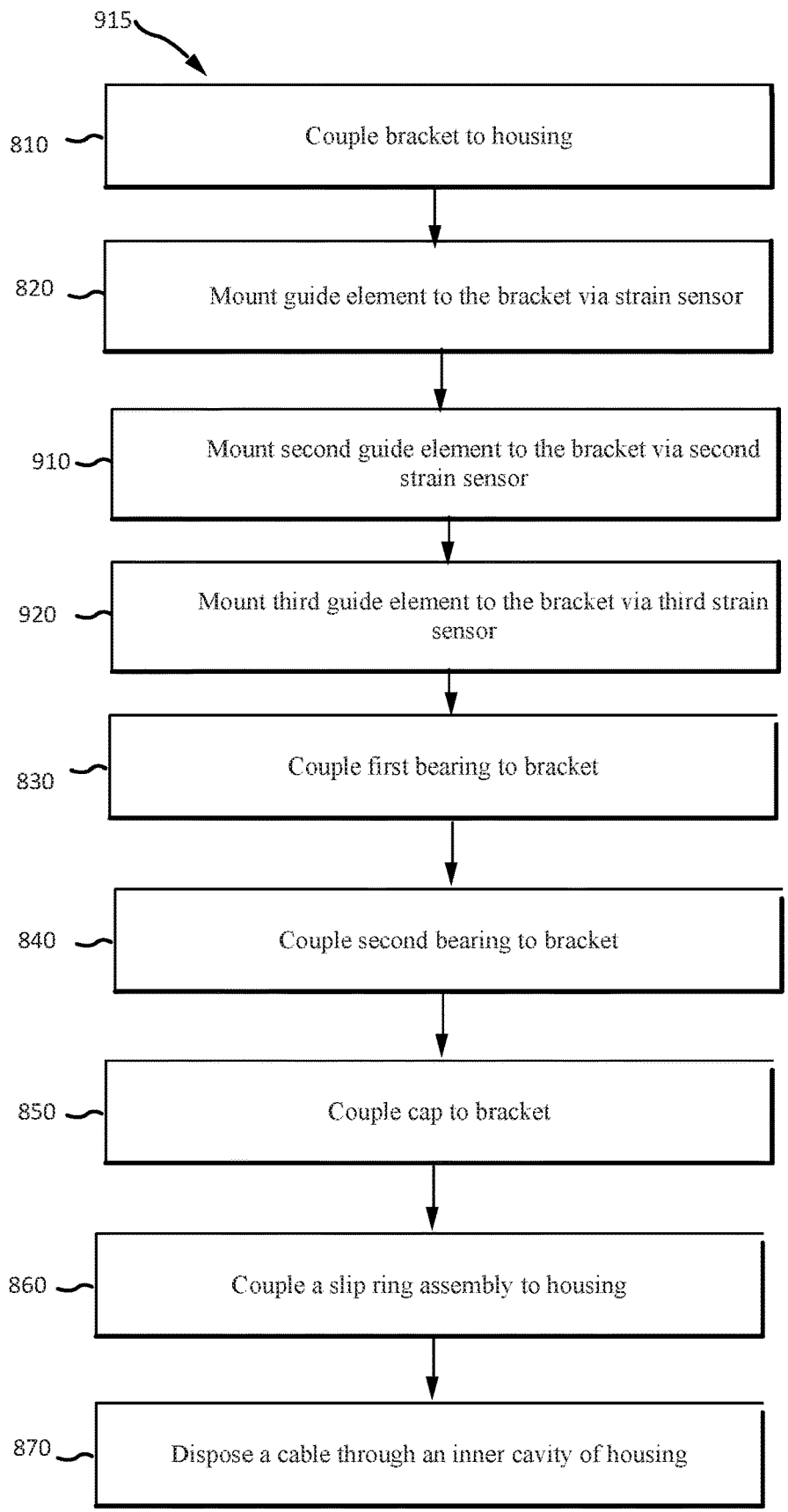
FIG. 10 illustrates a flow diagram of a process for manufacturing a cable angle detection assembly in accordance with various embodiments.

In various embodiments, and with reference to FIGS. 8-10, a method of manufacturing a cable angle detection assembly 800 is provided. The method may include coupling a bracket to a housing (step 810). The method may include mounting a guide element to the bracket via a strain sensor (step 820). The method may include coupling a first bearing to the bracket (step 830). The method may include coupling a second bearing to the bracket (step 840). The method may include coupling a cap to the bracket (step 850). The cap may comprising an aperture at least partially defined by an inner wall of the cap and passing from an upstream side to a downstream side of the cap. The method may include coupling a slip ring assembly to the housing (step 860). The method may include disposing a cable through an inner cavity of the housing (step 870). With reference to FIG. 9, a method of manufacturing a cable angle detection assembly 900 may include mounting a second guide element to the bracket via a second strain sensor (step 910). With reference to FIG. 10, a method of manufacturing a cable angle detection assembly 915 may include mounting a third guide element to the bracket via a third strain sensor (step 920).

Figure 11:
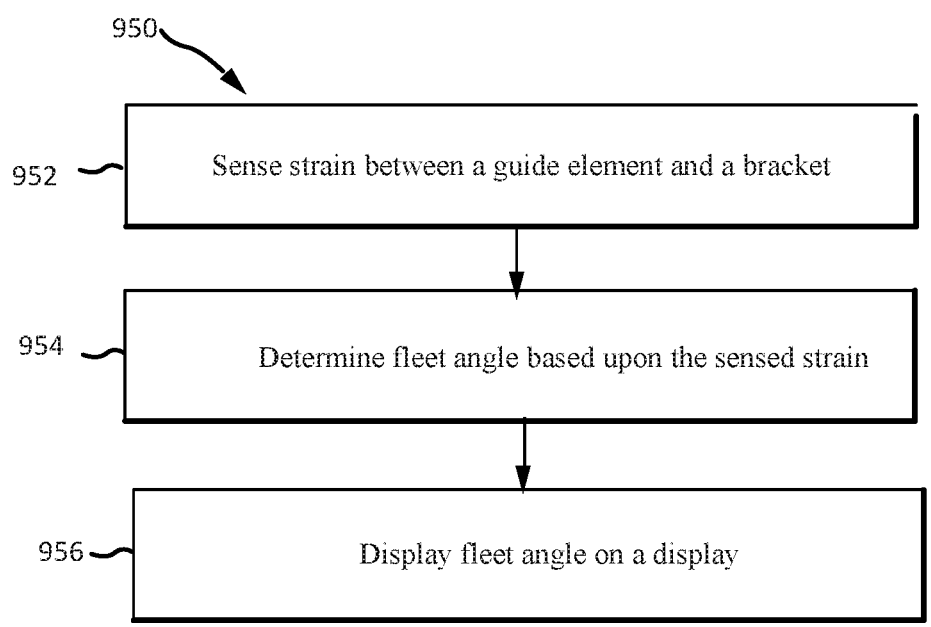
FIG. 11 illustrates a flow diagram of a method claim of detecting a fleet angle of a hoist assembly in accordance with various embodiments.

In various embodiments, and with reference to FIG. 11, a method of method of detecting a fleet angle of a hoist assembly 950 is provided. The method may include sensing strain between a guide element and a bracket, the guide element being configured to allow a cable in tension to wrap partially there-around between a first portion of the cable aligned with the bracket and a second portion of the cable that extends tangentially from the guide element in a direction of a load creating the tension in the cable (step 952). The method may include determining the fleet angle based upon the sensed strain and a level of tension in the cable (step 820). The method may include coupling a first bearing to the bracket (step 954). The method may include displaying the fleet angle on a display (step 956). In various embodiments, the level of tension in the cable is detected by at least one of a motor controller, a load pin or a load meter.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A cable angle detection assembly comprising:
a housing defining an axis configured to allow a cable to pass partially through the housing such that a first portion of the cable is aligned with the axis;
a bracket rotatably disposed within the housing;
a guide element mounted to the bracket configured to guide the cable, when in tension, to be wrapped partially therearound thereby allowing a fleet angle to be defined between the first portion of the cable and a second portion of the cable that extends tangentially away from the guide element;
a strain sensor directly coupled with the guide element and the bracket, the strain sensor configured to sense a load related to the fleet angle; and
at least one of a load pin and a load meter configured to detect a tension of the cable; and
a controller in electrical communication with the strain sensor and the at least one of the load pin and the load meter, the controller operable to:
receive a strain measurement from the strain sensor;
receive a tension measurement of the cable from the at least one of the load pin, and the load meter; and
calculate the fleet angle relative to the axis.

2. The cable angle detection assembly of claim 1, further comprising a first bearing disposed between the bracket and the housing at a first end of the housing and a second bearing disposed between the bracket and the housing at a second end of the housing.

3. The cable angle detection assembly of claim 1, wherein the strain sensor is a double shear load pin.

4. The cable angle detection assembly of claim 1, further comprising a slip ring assembly coupled with the housing.

5. The cable angle detection assembly of claim 1, further comprising a cap coupled with the bracket.

6. The cable angle detection assembly of claim 1, further comprising a second guide element configured to guide the cable, when in tension, to be wrapped partially therearound thereby allowing the fleet angle to be defined between the first portion of the cable and the second portion of the cable that extends tangentially away from the second guide element.

7. The cable angle detection assembly of claim 6, wherein the second guide element is mounted to the bracket via a second strain sensor.

8. The cable angle detection assembly of claim 6, further comprising a third guide element configured to guide the cable, when in tension, to be wrapped partially therearound thereby allowing the fleet angle to be defined between the first portion of the cable and the second portion of the cable that extends tangentially away from the third guide element.

9. The cable angle detection assembly of claim 8, wherein the third guide element is mounted to the bracket via a third strain sensor.

10. A hoist system comprising,
an airframe mechanically coupled to a hoist assembly;
a cable disposed between the hoist assembly and a hook assembly;
a cable angle detection assembly comprising:
a housing defining an inner cavity, wherein the housing comprises a first end and a second end downstream of the first end, the housing defining an axis configured to allow the cable to pass partially through the housing such that a first portion of the cable is aligned with the axis;
a bracket disposed within the housing;
a guide element mounted to the bracket via a strain sensor; and
a cap coupled with the bracket, the cap comprising an aperture at least partially defined by an inner wall of the cap and passing from an upstream side to a downstream side of the cap;
at least one of a load pin and a load meter configured to detect a tension of the cable; and
a controller in electrical communication with the strain sensor and the at least one of the load pin and the load meter, the controller operable to:
receive a strain measurement from the strain sensor;
receive a tension measurement of the cable from the at least one of the load pin and the load meter; and
calculate a fleet angle relative to the axis.

11. The hoist assembly of claim 10, wherein the cable angle detection assembly further comprises a first bearing disposed between the bracket and the housing at the first end of the housing and a second bearing disposed between the bracket and the housing at the second end of the housing.

12. The hoist assembly of claim 10, wherein the cable angle detection assembly further comprises a slip ring assembly coupled with the housing.

13. The hoist assembly of claim 10, wherein the cable abuts the guide element and creates a load in the strain sensor.

14. The hoist assembly of claim 10, wherein the strain sensor is a double shear load pin.

15. The hoist assembly of claim 10, wherein the cable angle detection assembly further comprises a second guide element mounted to the bracket via a second strain sensor and a third guide element mounted to the bracket via a third strain sensor.

16. The hoist assembly of claim 15, wherein the cable abuts the second guide element and creates a second load in the second strain sensor.

17. The hoist assembly of claim 15, wherein the cable is disposed within the inner cavity of the housing, wherein the cable abuts the third guide element and creates a third load in the third strain sensor.

18. A method of detecting a fleet angle of a hoist assembly comprising:
receiving, via a controller, a strain measurement between a guide element and a bracket from a strain sensor, the guide element being configured to allow a cable in tension to wrap partially there-around between a first portion of the cable aligned with the bracket and a second portion of the cable that extends tangentially from the guide element in a direction of a load creating the tension in the cable;

receiving, via the controller, a tension measurement of the cable from at least one of a load pin and a load meter; and determining, via the controller, the fleet angle based upon the strain measurement and the tension measurement.

19. The method of claim 18, further comprising sending, via the controller, the fleet angle to an output reader for a display.

\* \* \* \* \*